United States Patent [19]

Sheppard

[11] 4,411,549
[45] Oct. 25, 1983

[54] INSTALLATION AND RETAINER DEVICE FOR POWER STEERING PITMAN ARM

[76] Inventor: Peter H. Sheppard, R. H. Sheppard Co., Inc., Hanover, Pa. 17331

[21] Appl. No.: 219,389

[22] Filed: Dec. 22, 1980

[51] Int. Cl.³ ............................ B25G 3/00; F16B 9/00
[52] U.S. Cl. ..................................... 403/258; 403/260; 403/359; 403/264; 411/8
[58] Field of Search .............. 403/260, 255, 253, 359, 403/264, 258; 411/8, 10, 11, 301, 302, 304

[56] References Cited

U.S. PATENT DOCUMENTS

| | | | |
|---|---|---|---|
| 2,317,070 | 4/1943 | Le Tourneau | 403/255 |
| 2,607,956 | 8/1952 | Brutus | 411/304 x |
| 3,279,870 | 10/1966 | Janisewski | 403/260 X |
| 3,338,603 | 8/1967 | Sheppard | 403/359 X |
| 3,845,622 | 11/1974 | Hufstader | 403/258 X |
| 3,908,508 | 9/1975 | Payne | 411/14 |
| 4,138,922 | 2/1979 | Richter et al. | 411/14 |

FOREIGN PATENT DOCUMENTS

| | | | |
|---|---|---|---|
| 508923 | 2/1952 | Belgium | 403/255 |
| 745925 | 5/1944 | Fed. Rep. of Germany | 411/8 |
| 922407 | 1/1955 | Fed. Rep. of Germany | 403/255 |
| 1006061 | 4/1952 | France | 403/255 |
| 55105 | 8/1943 | Netherlands | 411/8 |
| 710820 | 6/1954 | United Kingdom | 403/255 |

OTHER PUBLICATIONS

Sheppard Power Steering Service Manual, pp. 48 and 49, 1979.

Primary Examiner—Wayne L. Shedd
Attorney, Agent, or Firm—King and Liles

[57] ABSTRACT

An installation and retainer cap is disclosed for making a secure connection between an annular internally splined collar member and an externally splined shaft end. The cap includes a cap body, a threaded driving shaft extending from the inner side of the body engaging a threaded bore in the end of the shaft, and an outer flange engaging the annular collar member. When the cap is driven in to make the completed connection, the outside face of the flange is substantially flush with the outside face of the annular collar member. Recesses are provided in the end of the shaft and in the outside face of the annular collar member to accommodate the body and the flange, respectively. A washer cooperating with the outer flange allows relative turning movement during the driving of the collar into position. An indicator pin provides an indication when the annular collar is fully installed on the shaft. An alternative embodiment utilizing a separate cap and driving bolt is also disclosed.

12 Claims, 6 Drawing Figures

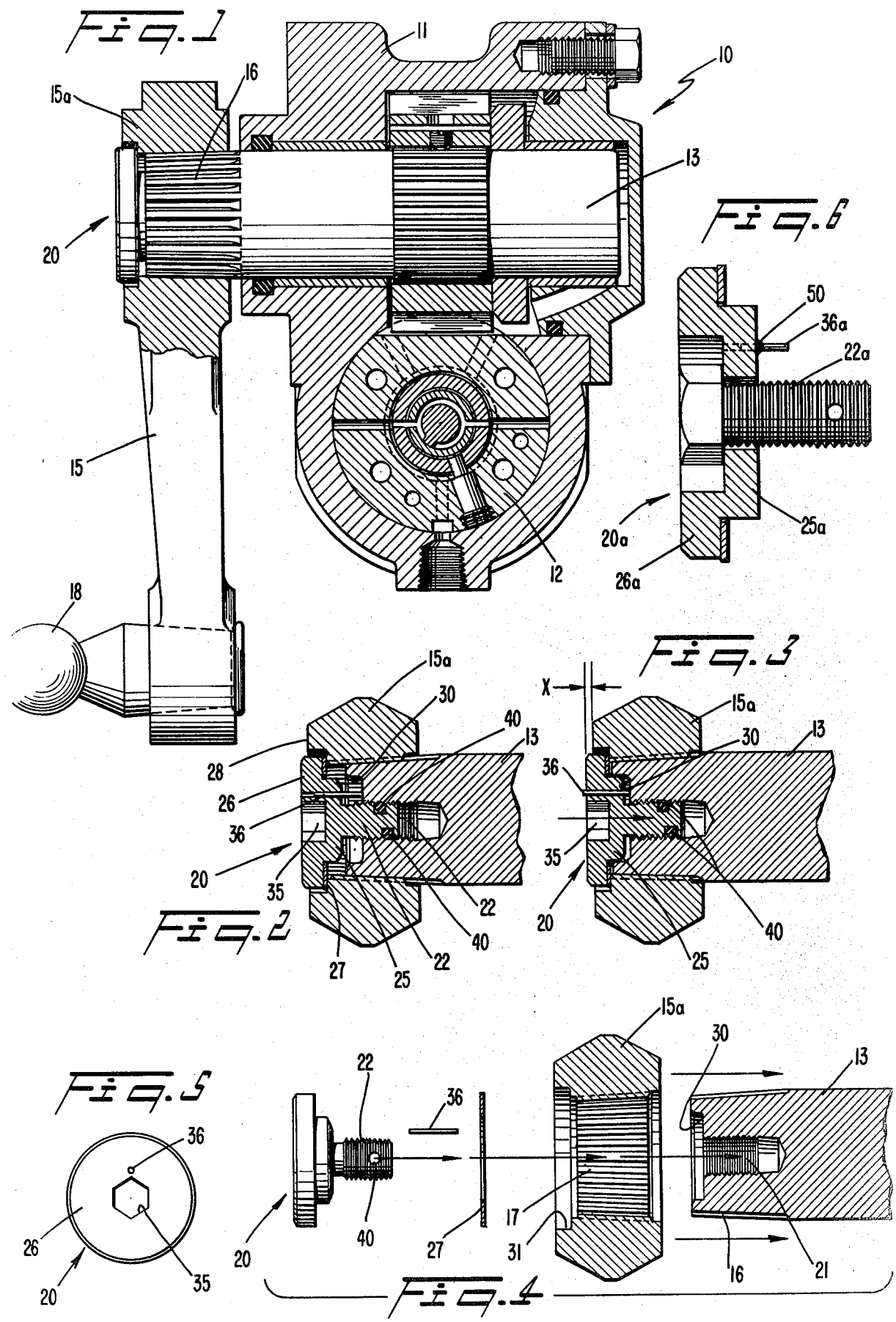

INSTALLATION AND RETAINER DEVICE FOR POWER STEERING PITMAN ARM

TECHNICAL FIELD

The present invention relates to devices for mounting and retaining an annular member to a shaft, and more particularly, to an installation and retainer cap for a pitman arm on the output shaft of a power steering gear.

BACKGROUND ART

In mounting a crank or lever on a working shaft, the arm is usually provided with an annular collar member at one end that embraces the end of the shaft. A highly effective way of mounting and locking the annular member to the shaft is to provide internal tapered involute splines on the annular member and mating external tapered involute splines on the end of the shaft.

A particular application of this mechanical connection technology, indeed the application where it was first used, is in the mounting of a pitman arm to the output shaft of a power steering gear. There is an important reason why this connection was invented in this environment. One standard mounting of the steering gear on large trucks positions the pitman arm outside the frame of the vehicle. The left front tire of the vehicle is normally in a position to come into close proximity to the frame and thus in direct conflict with the pitman arm and the end of the shaft when a hard right turn is made. The original invention obviated this interference problem by eliminating the draw down nut and lock washer at the end of the shaft.

This successful approach to solving this problem is found in the prior U.S. patent to Richard H. Sheppard, Joint Between Output Shaft and Pitman Arm, U.S. Pat. No. 3,338,603, issued Aug. 29, 1967. The patent specifically sets forth the concept of tapered involute splines for connecting the parts, and, more importantly, for the purpose of locking the two parts together so that under normal operating conditions the two parts are like one. In fact, tests have shown that during operation of a power steering gear with the splined connection of the '603 patent, the parts retain their original tightness. The oscillating motion of the arm actually causes the annular mounting member to tend to creep tighter and tighter on the end of the tapered shaft with each cycle of operation, thus automatically assuring that the parts do not separate.

In order to initially install the pitman arm with the designed tightness on the tapered, splined end of the output shaft, it has been common practice to provide an installation disk for engaging the outside face of the annular member, and a bolt extending through the disk with the threaded portion engaging a threaded bore in the end of the shaft. When the bolt is tightened to a specified torque, the pitman arm is properly installed.

Prior to the present invention, the art teaches the disk is simply removed from the output shaft once the arm had been properly tightened and the involute spline connection securely made. The disk previously used is relatively thick and extends well outside the profile of the pitman arm and the end of the shaft during use. These previous disk-like installation tools, if left in position, obviously would provide interference with the left front tire of the vehicle when a full right turn is made.

Furthermore, the previous designs utilized separate retainer devices, such as set screws that are threaded and extend down through the annular collar member and engage a groove around the splined end of the shaft. These retainer set screws are intended merely for the purpose of holding the position of the pitman arm secure in the event that the pitman arm is subjected to a large outside force, such as in a collision. The retainer screws hold, even though the splines on the annular mounting collar and the end of the shaft are mutilated or substantially destroyed by an overload.

Although the prior device set forth in the Sheppard '603 patent works well and exceeds specifications of steering gear manufacturers for strength and reliability, it would be desirable to have available a combined installation and retainer device for this application, as well as other applications where a collar and shaft end are to be connected for transmitting and converting substantial rotative torques into an oscillating movement, or vice-versa. It would also be desirable to have a device of this type where the proper installation is assured in each instance.

DISCLOSURE OF INVENTION

In view of these needs and desires for a more efficient mechanical connection, it is an object of the invention to provide such a connection including an annular collar mounted on the end of a shaft with a specially designed installation and retainer cap.

It is another object of the present invention to provide an installation and retainer cap of the type described wherein the clearance along the outside face of the annular member is not adversely affected when the cap is installed.

Another object of the present invention is to provide an installation and retainer cap partially recessed in the faces of the connecting parts to reduce the profile.

Still another object of the present invention is to provide an indicator built into the connecting parts for indicating when the full installation torque has been properly applied.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

Thus, to achieve the foregoing and other objects, and in accordance with the purposes of the present invention as described herein, an installation and retainer cap is provided having a cap body, a threaded shaft for driving engagement with a bore in the end of the shaft and an outer flange on the body for engaging the annular member and pulling the member on to the end of the shaft. When this is done, the clearance along the outside face of the annular member and the end of the shaft is not substantially adversely affected by the presence of the cap.

The substantially flush profile of the cap is advantageously enhanced in the preferred embodiment by the particular configuration of the cap itself and the unique mating recesses on the collar member and in the end of the working shaft. To provide added stability of the cap during the installation process, the peripheral inside face of the body closely matches the recess in the shaft thus providing a guiding function during the final driving stage.

The annular collar member and the shaft have internal and external tapered involute splines, respectively. This splined connection, when properly made by using the device of the present invention, provides full working and locking engagement between the parts. With the cap of the invention being left in place, the pitman arm is retained in the event that a large outside force is applied sufficient to mutilate the splines and thus effectively destroy the connection.

The cap of the present invention is provided with additional improvement features that are important. A washer positioned along the inside face of the flange, allows relatively low friction driving movement of the cap. An indicator pin extends through the cap body and is pushed outwardly during driving of the cap until the outer end is substantially flush indicating that the proper torque has been applied to the driving shaft. Bonding means, such as an epoxy resin may be provided between the pin and the cap to hold the pin in position before installation. The bond is broken during the initial driving movement of the cap.

The threaded driving shaft includes deformable plastic balls engaged by the threads in the bore to prevent inadvertent removal during use. A tool engaging recess is provided in the flange for engagement by the driving tool.

Preferably, 150 foot-pounds of torque are used to properly set a standard pitman arm on a standard output shaft of a power steering gear of the type described. Upon proper installation, the cap extends approximately ⅛ inch beyond the outside face of the annular collar member of the pitman arm.

In an alternative embodiment of the invention, the installation and retainer cap is made in two pieces; the cap body including the indicator and a threaded bolt passing through a central aperture in the cap body. This two-piece construction made in accordance with the broad aspects of the invention, may be desired in some instances, although the one-piece construction is normally preferred.

Still other objects and advantages of the present invention will become readily apparent to those skilled in this art from the following description, wherein I have shown and described only the preferred embodiments of the invention, simply by way of illustration of the best modes contemplated for carrying out the invention. As will be realized, the invention is capable of other and different embodiments, and its several details are capable of modification in various, obvious aspects, all without departing from the invention. Accordingly, the drawings and descriptions are to be regarded as illustrative in nature, and not as restrictive.

BRIEF DESCRIPTION OF DRAWINGS

The accompanying drawing, which is incorporated in and forms a part of this specification, illustrates several aspects of the present invention, and together with the description, serves to explain the principles of the invention. In the drawing:

FIG. 1 is a cross-sectional view partially broken-away showing the pitman arm and shaft end connection including the installation and retainer cap of the present invention;

FIG. 2 is a detail cross-sectional view of the connection shown in FIG. 1 with the parts in position prior to movement to the full working and locking engagement;

FIG. 3 is a cross-sectional view similar to FIG. 2 but showing the parts in the full working and locking position;

FIG. 4 is an exploded view with the parts separated and showing by arrows the manner in which the parts are initially assembled;

FIG. 5 is a top plan view of the installation and retainer cap of the present invention; and FIG. 6 is a cross-sectional view of an alternative embodiment wherein the cap body is separate from a driving bolt.

BEST MODE FOR CARRYING OUT THE INVENTION

Referencing FIG. 1 of the drawing in particular, a power steering gear, generally designated by the reference numeral 10 includes a housing 11, a reciprocating piston 12, and an output or working shaft 13. The operation of this gear is well known in the art, and as is fully set forth in prior Sheppard patents, such as the patent to R. H. Sheppard, entitled Power Steering Gear with Short Piston and Fluid Bearings, U.S. Pat. No. 4,088,063, issued May 9, 1978. The disclosure in this particular patent is incorporated herein by reference.

A pitman arm 15 having annular collar member or head 15a is mounted on the outer end of the output shaft 13. As previously set forth, the connection is made by mating tapered involute splines on the shaft 13, as shown by external splines 16 in FIG. 1, and tapered involute internal splines in the head 15a, as shown by spline 17 in FIG. 4. At the distal end of the pitman arm 15 a standard ball 18 is mounted for coupling to the conventional drag link of the steering system of a vehicle. In accordance with the invention, the connection between the annular collar member 15a and the shaft end is made using an installation and retainer cap 20.

As best shown in FIG. 4, the output or working shaft 13 includes a threaded bore 21 at the connection end. This end of the shaft has the splines 16 and is tapered. The mating splines 17 within the annular collar member 15a are similarly tapered. The collar member fits on the end of the shaft, as shown by the arrows in FIG. 4. A threaded driving shaft 22 on the cap 20 engages the threaded bore 21, also as evident by the arrow in FIG. 4. The parts are initially assembled, as best shown in FIG. 2.

The cap 20 includes a body 25 from which the driving shaft 22 extends from the inner side thereof. On the opposite side of the body 25 is an outer flange 26. On the inside face of the flange 26, a washer 27 is provided.

As best shown in FIGS. 1, 2 and 3, when the cap 20 is seated in position at the connection between the annular collar member 15a and the end of the working shaft 13, the outside face of the flange 26 is substantially flush with outside face 28 of the annular collar member 15a. This flush positioning is particularly significant once the cap 20 has been driven to the final mounted and locked position of the joint, as shown in FIGS. 1 and 3. This is the operating position for the power steering gear and with the substantially flush mounting, interference with the wheel of the vehicle is advantageously avoided.

The cap 20 remains in place after installing the pitman arm 15 and thus serves as a retainer cap in the unlikely event that an accident occurs causing a large outside force to impact pitman arm 15 and cause mutilation of the splines 16, 17 and loosening of the arm. The cap 20 holds the arm in place for safety and replaces the set screws previously engaging the sides of the output shaft, as taught in the prior Sheppard '603 patent, referenced above.

To allow the body 25 of the cap 20 to have substantial strength to perform its installation and retaining function, and to also allow full engagement along the tapered involute splines 16, 17, a recess 30 is provided (see FIGS. 2 and 4) to accommodate at least a portion of the body. The outer peripheral face of the body 25 closely matches the inner peripheral face of the recess 30 (see FIG. 3). This means that during the driving of the cap 20 to the final mounted and retained position shown in FIG. 3, the body is advantageously guided, steadying the parts and thereby causing the splines 16, 17 to securely lock together. A similar recess 31 (see FIG. 4) is provided in the outside face of the collar member 15a providing an indentation for most of the outer flange 26 and thereby providing a substantially flush outside face, as pointed out above.

The metal of the pitman arm 15 and the annular collar member 15a is a cast grey iron or a cast compacted graphite iron. Because of this, the face of the recess 31 is not a hardened surface. It is for this reason that the washer 27 is provided and is of a relatively hard machine steel. The cap 20 is also a relatively hard machine steel and must be driven by substantial force, namely 150 foot-pounds of torque. This force is accommodated without wearing away the engaging face of the recess 31 since the inside face of the flange 26 will slide relative to the hard washer 27. Thus, the low friction driving movement of the cap 20 allows easy installation of the collar 15a on the end of the shaft 13 with the final mounted position shown in FIG. 3 of the drawing.

The driving force is applied to the cap 20 through a tool engaging recess 35 (see FIGS. 3 and 5). This multifaced recess 35 is engaged by a tool having cooperating outside faces.

In accordance with another aspect of the present invention, an indicator pin 36 is mounted with a close fit in a bore through the flange 26 and body 25 extending substantially parallel to the threaded shaft 22. The length of the pin is such that the inner end of the pin engages the end of the shaft in the recess 30 (see FIG. 2), and upon driving movement of the cap 20, the pin is pushed outwardly until the outer end is substantially flush with the outside face of the flange 26 (see FIG. 3). This is a failsafe indicator for the assembly person and the final inspection person confirming that the splines 16, 17 are fully engaged, as shown in FIG. 3.

The results and the advantages of the dual function cap 20 of the present invention can now be realized. The cap 20 is uniquely engineered so as to take the full driving force required for installing the annular collar member 15a on the shaft 13 so as to provide a full working and locking engagement between the tapered involute splines 16, 17. When the parts are thus assembled, they are maintained in locked engagement without any additional retainer under normal operating conditions. With each working cycle of the steering gear 10, the nature of the tapered involute splines is such that the connection remains tight and secure. However, the cap 20 is left in place for the purpose of retaining the pitman arm 15 in the event of impact destruction of the tapered spline joint. The cap 20 is unique in design in this respect since it is substantially flush with the outside face of the annular collar member 15a and thus does not interfere with the driving wheel of the vehicle. As shown in the preferred embodiment, the outer face of the flange 26 extends out only a distance X; namely, approximately ⅛ inch from the outside face 28 of the collar 15a.

In order to assure retention of the cap 20 in place as a retainer device, a plurality of plastic insert members 40 are positioned in lateral recesses in the driving shaft 22, as best shown in FIGS. 2 and 4. As the cap 20 is driven into the final position (FIG. 3) the plastic balls 40 are deformed by the inside threads of the bore 21 providing a high frictional engagement and resisting inadvertent removal of the cap 20.

An alternative embodiment of the installation and retainer cap is shown in FIG. 6 wherein like reference numerals with the added suffix "a" refer to like parts of the embodiment of FIGS. 1–5. In this embodiment, the cap 20a is in two parts with the body 25a and the flange 26a being integral, but separate from the threaded shaft, a standard bolt 22a. The bolt has a standard driving head (as shown) to be engaged by a standard socket tool. Indicator pin 36a is held in position and secured by a suitable bonding means, such as an epoxy resin ring 50. A similar epoxy ring (now shown) can of course be utilized on the first embodiment to hold the pin 36 in position prior to installation. In either case, this bonding ring is sufficiently strong to prevent removal of the parts prior to use, but allows breaking of the bond during the initial driving movement of the caps 20 or 20a so that its indicating function can be performed.

The foregoing description of the embodiments of the apparatus of the invention has been provided for purposes of illustration and description. It is not intended to be exhaustive or to limit the invention to the precise form disclosed. Obvious modifications and variations are possible in light of the above teachings.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:
1. In combination with a working shaft having a threaded bore in the one end, an installation and retainer cap assembly mounting and locking an annular collar member on the working shaft comprising:
 a body on the said retainer cap;
 a threaded shaft extending from the inner side of the body, said shaft being threadably received by said bore and axially advancing the retainer cap into the bore, said body being enlarged relative to said shaft;
 said annular collar member and said shaft having internal and external splines, respectively, the cooperating splines of said member and said working shaft being tapered involute splines which lock together, said cap providing full working and locking engagement between said splines;
 a recess in the end of the threaded bore substantially matching said body in size and receiving and accommodating at least a portion of said body and stabilizing the retainer cap during the axial advance into the bore; and
 an outer cap flange on the opposite axial side of said body from said threaded shaft and extending around the periphery of said body, the inside face of said cap flange selectively engaging the outside face of the annular collar member, the outside face of the cap being substantially flush with said outside face of the annular collar member during the engagement between the inside flange face and the outside collar face, whereby the clearance along the outside face of the annular member is not substantially adversely affected by the presence of said retainer cap.

2. The installation and retainer cap of claim 1 wherein the outside face of said member includes a recess to receive at least a portion of said flange.

3. The installation and retainer cap of claim 1 wherein is provided a washer positioned around the body between the inside face of said flange and the outside face of said member to allow relatively low friction movement.

4. The installation and retainer cap of claim 1 wherein is provided indicator means on said cap body indicating the full working and locking engagement between said splines.

5. The installation and retainer cap of claim 4 wherein is provided bonding means between said pin and said cap, said bonding means being sufficiently strong to positively prevent removal prior to use but allowing breaking of the bond during initial driving movement of the cap.

6. The installation and retainer cap of claim 1 wherein the outside face of said cap extends outwardly from the outside face of said member by approximately ⅛ inch.

7. The installation and retainer cap of claim 1 wherein is provided a tool engaging recess in said flange for driving the cap.

8. The installation and retainer cap of claim 1 wherein is provided plastic means on said threaded driving shaft for deformation in said bore to resist inadvertent removal.

9. The installation and retainer cap of claim 1 wherein said threaded shaft is a bolt separate from said cap body and passing through a central aperture in said body.

10. The installation and retainer cap of claim 1 wherein said annular member is the head of a steering pitman arm and said shaft is the output shaft of a steering gear.

11. The installation and retainer cap of claim 10 wherein said pitman arm is installed on the output shaft of a steering gear with approximately 150 foot-pounds of torque applied to said threaded shaft.

12. In combination with a working shaft having a threaded bore in one end, an installation and retainer cap assembly mounting and locking an annular collar member on the working shaft, comprising:
  (a) a body on said retainer cap;
  (b) a threaded shaft extending on one axial side of said body, said shaft being threadably received by said threaded bore axially advancing the retainer cap therein, said body being enlarged relative to said shaft;
  (c) a recess in the end of the threaded bore receiving at least a portion of the body;
  (d) said retainer cap including a flange on the opposite side of said body from said threaded shaft, said flange being enlarged relative to said body;
  (e) an indicator bore extending through both said body and said flange in parallel relationship to said threaded shaft; and
  (f) an indicator pin having an axial dimension corresponding substantially to the combined axial dimensions of said body and said flange closely fitted in said indicator bore, said indicator pin being selectively engagable with the working shaft and axially movable through said indicator bore as the retainer cap is threadably advanced into the threaded bore, the pin being pushed outwardly during axial advancing of the cap until the outer end is substantially flush with the outside face of said flange thereby indicating the full working and locking engagement between said splines, said pin being retained in said bore.

* * * * *